United States Patent
Sun (10) Patent No.: US 10,676,682 B2
(45) Date of Patent: Jun. 9, 2020

(54) PROCESS AND APPARATUS FOR RECOVERING HYDROCRACKED EFFLUENT WITH VACUUM SEPARATION

(71) Applicant: UOP LLC, Des Plaines, IL (US)

(72) Inventor: Ping Sun, Riverside, IL (US)

(73) Assignee: UOP LLC, Des Plaines, IL (US)

( * ) Notice: Subject to any disclaimer, the term of this patent is extended or adjusted under 35 U.S.C. 154(b) by 20 days.

(21) Appl. No.: 15/825,037

(22) Filed: Nov. 28, 2017

(65) Prior Publication Data

US 2019/0161694 A1    May 30, 2019

(51) Int. Cl.
| | |
|---|---|
| *B01D 3/06* | (2006.01) |
| *C10G 70/04* | (2006.01) |
| *C10G 7/06* | (2006.01) |
| *C10G 47/26* | (2006.01) |
| *B01D 3/10* | (2006.01) |
| *B01D 3/14* | (2006.01) |

(52) U.S. Cl.
CPC .............. *C10G 70/041* (2013.01); *B01D 3/06* (2013.01); *B01D 3/106* (2013.01); *B01D 3/143* (2013.01); *C10G 7/06* (2013.01); *C10G 47/26* (2013.01); *C10G 2400/04* (2013.01); *C10G 2400/06* (2013.01)

(58) Field of Classification Search
None
See application file for complete search history.

(56) References Cited

U.S. PATENT DOCUMENTS

| | | | |
|---|---|---|---|
| 3,494,855 A | 2/1970 | Stine et al. | |
| 3,551,323 A * | 12/1970 | Hamblin | C10G 47/00 208/58 |
| 4,400,263 A | 8/1983 | Kydd et al. | |
| 4,676,886 A | 6/1987 | Rahbe et al. | |
| 4,740,489 A | 4/1988 | Bearden et al. | |
| 5,041,206 A | 8/1991 | Sequeira et al. | |
| 5,474,977 A | 12/1995 | Gatsis | |
| 5,755,955 A | 5/1998 | Benham et al. | |
| 5,980,732 A | 11/1999 | Gillis | |
| 8,470,251 B2 * | 6/2013 | McGehee | C10G 47/00 422/140 |
| 9,394,496 B2 | 7/2016 | Qafisheh et al. | |
| 10,195,588 B1 * | 2/2019 | Do | B01J 23/28 |
| 2009/0127161 A1 * | 5/2009 | Haizmann | C10G 11/18 208/59 |
| 2010/0248946 A1 | 9/2010 | Bauer et al. | |
| 2010/0326887 A1 * | 12/2010 | McGehee | C10G 47/00 208/107 |

(Continued)

FOREIGN PATENT DOCUMENTS

SU    302897 A1    6/1971

OTHER PUBLICATIONS

Vladimirova, "PCT Search Report dated Apr. 11, 2019", Apr. 11, 2019, Published in: Russia.

*Primary Examiner* — Tam M Nguyen
(74) *Attorney, Agent, or Firm* — Paschall & Associates, LLC; James C. Paschall (57) ABSTRACT

A vacuum separator is used to separate a pitch stream from a slurry hydrocracking reactor upstream of the product fractionation column. The process and apparatus removes pitch from the product streams to enable easier separation of light VGO from heavy VGO in a fractionation column.

12 Claims, 3 Drawing Sheets

(56) References Cited

U.S. PATENT DOCUMENTS

| | | | | |
|---|---|---|---|---|
| 2010/0329935 A1* | 12/2010 | McGehee | ............... | C10G 47/00 |
| | | | | 422/140 |
| 2011/0303580 A1* | 12/2011 | Haizmann | ............... | C10G 47/26 |
| | | | | 208/40 |
| 2011/0306490 A1* | 12/2011 | Bhattacharyya | ......... | B01J 21/04 |
| | | | | 502/220 |
| 2016/0130511 A1 | 5/2016 | Govindhakannan | | |
| 2017/0050177 A1* | 2/2017 | Greeley | ................... | B01J 37/18 |
| 2018/0273856 A1* | 9/2018 | Bartolini | ................ | C10G 31/06 |
| 2018/0282639 A1* | 10/2018 | Yokomizo | ............ | C10G 51/026 |
| 2019/0194553 A1* | 6/2019 | Sun | ........................ | C10G 47/26 |

\* cited by examiner

PROCESS AND APPARATUS FOR RECOVERING HYDROCRACKED EFFLUENT WITH VACUUM SEPARATION

FIELD

The field is the recovery of a pitch containing stream from a slurry hydrocracked hydrocarbon stream.

BACKGROUND

Hydroprocessing includes processes which convert hydrocarbons in the presence of hydroprocessing catalyst and hydrogen to more valuable products.

Hydrotreating is a hydroprocessing process used to remove heteroatoms such as sulfur and nitrogen from hydrocarbon streams to meet fuel specifications and to saturate olefinic compounds. Hydrotreating can be performed at high or low pressures, but is typically operated at lower pressure than hydrocracking.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst.

Slurry hydrocracking (SHC) is a slurried catalytic process used to crack residue feeds to gas oils and fuels. SHC is used for the primary upgrading of heavy hydrocarbon feed stocks obtained from the distillation of crude oil, including hydrocarbon residues or its mixture with gas oils from atmospheric distillation tower bottoms or vacuum distillation tower bottoms. Alternative sources of heavy hydrocarbon feed stocks include solvent deasphalted pitch or visbroken residues. In slurry hydrocracking, these liquid feed stocks are mixed with hydrogen and solid catalyst particles, e.g., as a particulate metallic compound such as a metal sulfide, to provide a slurry phase. Slurry hydrocracked effluent exits the slurry hydrocracking reactor at very high temperatures around 400° C. (752° F.) to 500° C. (932° F.). Representative SHC processes are described, for example, in U.S. Pat. Nos. 5,755,955 and 5,474,977.

One difficulty with SHC processes is the increased risk of reactor fouling when operating at higher pitch conversion. Pitch recycle can be used to reduce the potential for reactor fouling and is necessary to achieve high pitch conversion. Incompatibility can also occur in fractionation columns or other vessels when different hydrocarbon streams are contacted with each other and form immiscible liquid phases due to thermodynamic phenomena.

In an SHC process, recovery of pitch is typically achieved by a vacuum fractionation column that cooperates with an upstream series of separators, stripper(s) and an atmospheric fractionation column. Atmospheric and vacuum fractionation columns provide streams with specified boiling point ranges that are transported to downstream upgrading units. The vacuum fractionation column separates an unconverted pitch stream from vacuum gas oil (VGO). Other recovered products include naphtha, kerosene and diesel.

SHC products typically require additional heating before delivery to a vacuum fractionation column. To achieve low VGO concentration and high pitch concentration in the vacuum bottom stream, the fractionator feed stream and column vaporization zones require high temperature to make up for losses in vacuum pressure encountered while passing through vacuum packing materials along the height of the column. Packing materials are added to achieve efficient separation of product streams. High temperature increases the risk of severe fouling. Otherwise, poor separation can result in high concentrations of VGO or even lighter products in the vacuum column bottoms.

Improved fractionation of pitch from VGO is needed in SHC recovery processes.

BRIEF SUMMARY

We have found that removing unconverted pitch from a SHC reactor effluent using a vacuum separator before product fractionation improves efficiency in separating VGO from pitch and reduces fouling related operational difficulties in product fractionation. Product fractionation may be made in one single fractionation step because pitch is separated before products reach fractionation units. The vacuum fractionation may be made easier because feed is free of or reduced in pitch material. Pitch separated in a vacuum separator may be recycled to the SHC reactor. The proposed process and apparatus reduce capital and operational costs due to better utilization of slurry reactor enthalpy.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, "pitch" means the hydrocarbon material boiling above about 524° C. (975° F.) AEBP as determined by any standard gas chromatographic simulated distillation method such as ASTM D2887, D6352 or D7169, all of which are used by the petroleum industry.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D-7169, ASTM D-86 or TBP, as the case may be.

As used herein, the term "end point" (EP) means the temperature at which the sample has all boiled off using ASTM D-7169, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.).

As used herein, "pitch conversion" means the conversion of materials boiling above 524° C. (975° F.) converting to material boiling at or below 524° C. (975° F.) based on a mass flow rate.

As used herein, "vacuum gas oil" means a hydrocarbon material having an IBP of at least about 232° C. (450° F.), a T5 of about 288° C. (550° F.) and about 372° C. (702° F.), typically no more than about 343° C. (650° F.), a T95 between about 510° C. (950° F.) and about 570° C. (1058° F.) and, or an EP of no more than about 626° C. (1158° F.) prepared by vacuum fractionation of atmospheric as determined by any standard gas chromatographic simulated distillation method such as ASTM D2887, D6352 or D7169, all of which are used by the petroleum industry.

As used herein, "atmospheric residue" means a hydrocarbon material having an IBP of at least about 232° C. (450° F.), a T5 of about 288° C. (550° F.) and about 372° C. (702° F.), typically no more than about 343° C. (650° F.), and a T95 between about 510° C. (950° F.) and about 700° C. (1292° F.) obtained from the bottoms of an atmospheric crude distillation column.

As used herein, "vacuum residuum" means the hydrocarbon material boiling with an IBP of at least 500° C. (932° F.) and preferably at least 524° C. (975° F.).

As used herein, "heavy vacuum gas oil" means the hydrocarbon material boiling in the range between about 427° C. (800° F.) and about 524° C. (975° F.) AEBP as determined by any standard gas chromatographic simulated distillation method such as ASTM D2887, D6352 or D7169, all of which are used by the petroleum industry.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, "mesophasic material" means a toluene insoluble, second liquid hydrocarbon phase that is not miscible with primary bulk hydrocarbon liquid in a slurry hydrocracking reactor, which can be measured by a microscopic technique according to ASTM 4616.

The term "$C_x$" are to be understood to refer to molecules having the number of carbon atoms represented by the subscript "$x$". Similarly, the term "$C_{x-}$" refers to molecules that contain less than or equal to x and preferably x and less carbon atoms. The term "$C_{x+}$" refers to molecules with more than or equal to x and preferably x and more carbon atoms.

DETAILED DESCRIPTION

We have found that incompatibility problems are prone to occur in a vacuum fractionation column fractionating pitch streams. When a combination of streams from other separation units including an atmospheric fractionation column make contact with a pitch stream added to the fractionation column at an adjacent or same inlet location, the asphaltenes in the pitch stream can precipitate in the presence of lighter streams due to their incompatible phases, especially when pitch conversion is high, e.g. greater than 90 or 95% pitch conversion. Avoiding mixing lighter products into unconverted pitch facilitates stable operation in fractionation columns.

High pitch conversion is important to improve refinery economics. However, high pitch conversion frequently features a high degree of dealkylation and unconverted highly dealkylated aromatic asphaltenes. In these cases, incompatibility issues are more severe. As a result, reactor and fractionation column fouling may be common at high conversion levels. This can be addressed by a high concentration of catalyst or an excessive hydrogen partial pressure which both add to elevated cost. Pitch recycle is a more effective and economical process solution to stabilize SHC reactor content from fouling at higher conversion conditions.

Proposed is immediate recovery of unconverted pitch through a vacuum flash separation which efficiently utilizes the high enthalpy of SHC products immediately exiting the SHC reactor or a high temperature separator to provide several benefits. No additional heating is needed for the pitch to be predominantly separated from the VGO stream. Economic benefit is greater when higher pitch recycle is needed to enable more stable reactor operation at a high pitch conversion. Immediate recovery of unconverted pitch in a standalone vacuum flash system unit avoids incompatibility issues frequently resulted from contacting pitch with lighter, non-solvent or low solvency product streams as more commonly exhibited in a conventional product fractionator. Because full retention of all pitch containing streams occurs in a vacuum flash separator, product fractionation involves a low pitch material stream that enables focus on separation efficiency for lower boiling point products at a much reduced requirement for temperature and vacuum levels. Operational cost for fractionation units is significantly lower because the difficult separation of pitch from VGO is obviated. This is extremely important for a contemporary refinery recovery section when precise product fractionation is needed for finishing steps downstream of the SHC reactor.

The embodiments herein can be applicable to any hydroprocessing apparatus or process that includes pitch in the product stream. SHC is one such hydroprocessing apparatus and process, so the description will be directed to a SHC unit although the application is not so limited.

Figure 1:
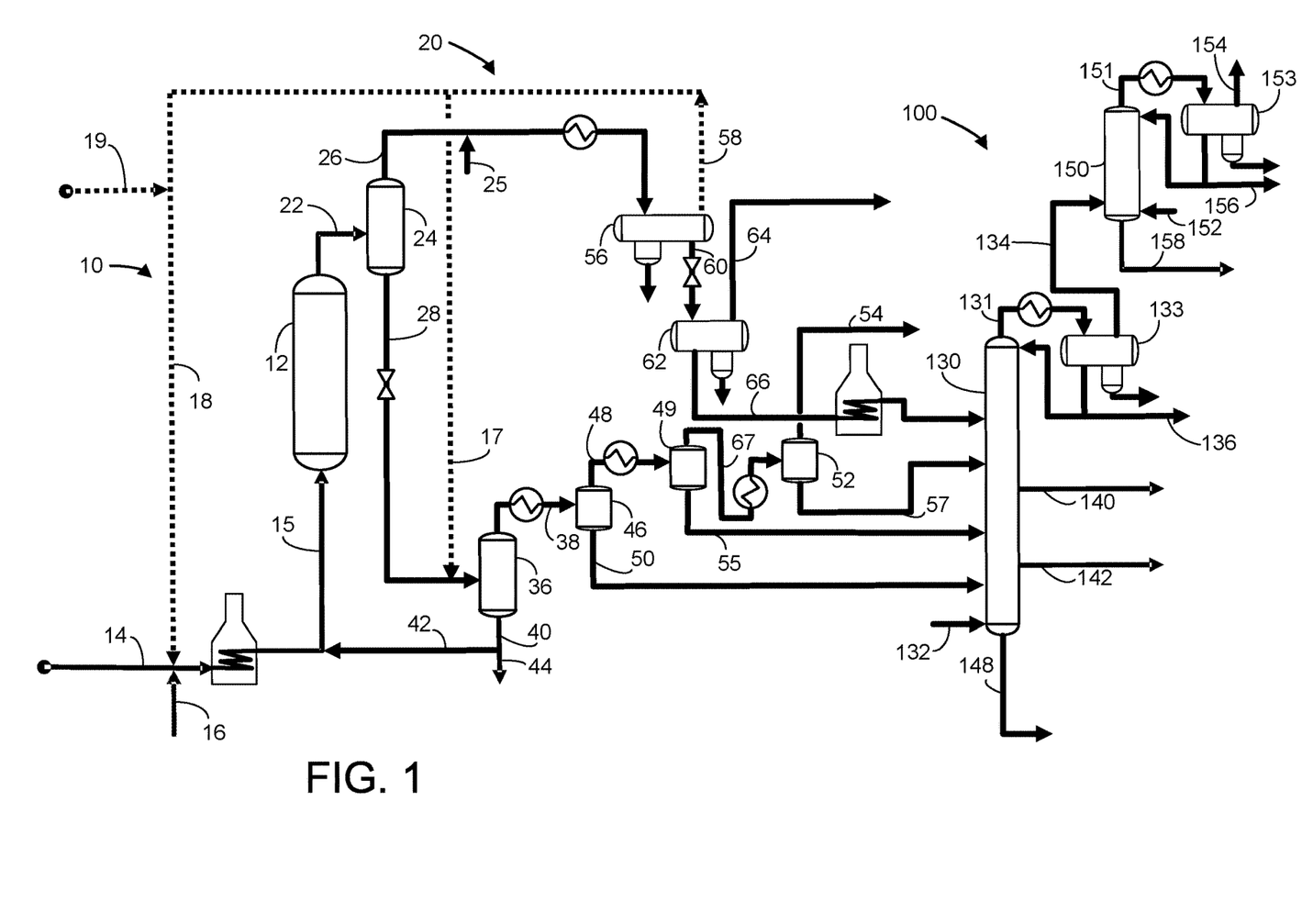
FIG. 1 is a simplified process flow diagram.

The apparatus and process 10 involves a hydroprocessing section 10, a separation section 20 and a fractionation section 100. The hydroprocessing section 10 can include one single SHC reactor or at least two SHC reactors 12 in series. A hydrocarbon feed stream in feed line 14 may be mixed with a catalyst stream from catalyst line 16 and hydrogen from a hydrogen line 18, heated and fed to the SHC reactor 12 in charge line 15. Make-up hydrogen may be provided in a make-up line 19 to the hydrogen line 18.

Generally, the SHC reactor 12 can comprise one or more reactors e.g., two or three reactors in series that operate at any suitable conditions, such as a temperature of about 400° C. (752° F.) to about 500° C. (932° F.) and a pressure of about 10 to about 24 MPa. Exemplary slurry hydrocracking reactors are disclosed in, e.g., U.S. Pat. Nos. 5,755,955; 5,474,977; US 2009/0127161; US 2010/0248946; US 2011/0306490; and US 2011/0303580. Often, slurry hydrocracking is carried out using reactor conditions sufficient to crack at least a portion of a hydrocarbon feed 14 to lower boiling products, such as gas oil, diesel, naphtha, and/or $C_1$-$C_4$ products. The hydrocarbon feed stream in feed line 14 can include a stream of hydrocarbons boiling from about 340° C. (644° F.) to about 570° C. (1058° F.), atmospheric residue, vacuum residue, visbreaker bottoms, solvent deasphalted pitch, tar, bitumen, coal oil, and shale oil. The catalyst stream in the catalyst line 16 may be combined with the hydrocarbon feed stream in feed line 14 to obtain a solids content of about 0.01 to about 10 wt % before or after being combined with hydrogen. Hydrogen in the hydrogen line 18 may be separately fed to the SHC reactor 12. More than one SHC reactor 12 may be used with interstage separation between reactors. Overall pitch conversion should be at least 85%, suitably 90% and preferably at least 95%.

Typically, the slurry catalyst composition can include a catalytically effective amount of one or more compounds including iron. Particularly, the one or more compounds can include at least molybdenum in hydrocarbon, on carbon or on a support or one of an iron oxide, an iron sulfate, and an iron carbonate. Alternatively, the one or more compounds can include at least one of an iron oxide, an iron sulfate, and an iron carbonate. Other forms of iron can include at least one of an iron sulfide, a pyrrhotite, and a pyrite. What is more, one or more catalyst particles can include about 2 to about 45 wt % iron oxide and about 20 to about 90 wt % alumina such as bauxite. Alternatively, the catalyst can contain materials other than an iron, such as at least one of molybdenum, nickel, cobalt and manganese, and/or a salt, an oxide, and/or a mineral thereof. In another exemplary embodiment, it may be desirable for the catalyst to be supported. As a consequence, such a catalyst can include a support of alumina, silica, titania, one or more aluminosilicates, magnesia, bauxite, coal and/or petroleum coke. Such a supported catalyst can include a catalytically active metal, such as at least one of iron, molybdenum, nickel, cobalt and vanadium, as well as sulfides of one or more of these metals. Generally, supported catalyst can have about 0.01 to about 30 wt % of the catalytic active metal based on the total weight of the catalyst.

A slurry hydrocracked effluent stream exits the SHC reactor in an effluent line 22 and is fed to the separation section 20. Generally, a hydroprocessing effluent stream in effluent line 22 from the SHC reactor 12 may or may not be quenched with cool hydrogen from hydrogen line 18. The separation section 20 can include several separators. The hydrocracked effluent stream is fed by the effluent line 22 to a hot high pressure separator 24 which is in downstream communication with the SHC reactor 12. The hot high pressure separator 24 separates the hydrocracked effluent stream in the effluent line 22 at high pressure to provide a hot vapor stream in a hot overhead line 26 extending from a top of the hot high pressure separator 24 and a hot liquid stream in a hot bottoms line 28 extending from a bottom of the hot separator. The hot high pressure separator 24 is operated at about the same pressure and similar to or lower than the temperature of the SHC reactor 12. The hot high pressure separator 24 may be operated at pressures between about 9 MPa (g) (1305 psig) and about 23 MPa (g) (3335 psig).

The hot liquid stream in the hot bottoms line 28 may be let down in pressure to concentrate the unconverted material in a single step, optionally cooled and delivered to a vacuum pressure separator 36 which is in downstream communication with the SHC reactor 12 and the hot high pressure separator 24. The vacuum pressure separator 36 separates the hot liquid stream in the hot bottoms line 28 at vacuum pressure to provide a vapor vacuum stream in a vacuum overhead line 38 extending from a top of the vacuum separator 36 and a vacuum pitch stream in a vacuum bottoms line 40 extending from a bottom of the vacuum separator. The vacuum pitch stream is predominantly pitch: a predominant mass of the vacuum pitch stream boils in the pitch boiling range. The vacuum separator 36 is operated at about 1 to about 50 torr and similar to or lower than the temperature of the high pressure separator 24. It is contemplated to provide a hydrogen rich stream in a quench line 17 along with the hot liquid stream in the hot bottoms line 28 to the vacuum separator 36 to adjust temperature or to inhibit fouling when necessary.

A portion of the pitch stream in the vacuum bottoms line 40 can be recycled in recycle line 42 to the charge line 15 while another portion of the pitch stream in vacuum bottoms line 40 may be taken in line 44 to catalyst recovery and further processing such as ash removal to provide pitch for other uses. Recycling pitch to the SHC reactor section 12 in the recycle line 42 enables the pitch stream to undergo further pitch conversion to lower boiling hydrocarbons and provide solvency to suppress generation of mesophase in the SHC reactor 12. The SHC reactor 12 is in downstream communication with the vacuum bottoms line 40 and the vacuum separator 36.

A mass ratio of recycle pitch to fresh feed ratio is an important control factor. At high pitch conversion of at least 85%, suitably 90%, a mass rate ratio of recycle pitch in the recycle line 42 to the hydrocarbon feed in feed line 14 is should be about 0.2 to about 1, suitably about 0.3 to about 0.7, and preferably not more than about 0.6. Not only is the mass ratio of pitch important, the mass fraction of pitch in the recycle stream is also important. At high pitch conversion of at least 85%, suitably 90% and preferably 95%, it is preferable to sustain a pitch mass fraction of 70 wt % or greater in the pitch stream recycled in the recycle line 42 to the SHC reactor 12. The vacuum separator 36 can provide the preferable pitch mass fraction in the pitch stream recycled to the SHC reactor 12 to sustain a high conversion but stable operation.

The vapor vacuum stream in the vacuum overhead line 38 may be cooled in a condenser to condense a portion of the vapor vacuum stream. The cooled vapor vacuum stream in the vacuum overhead line 38 may be separated in a primary vacuum flash drum 46 into a primary vapor vacuum stream in a primary vacuum flash overhead line 48 extending from a top of the primary vacuum flash drum 46 and a primary condensed vacuum stream in a primary vacuum flash bottoms line 50 extending from a bottom of the primary vacuum flash drum. The primary vacuum flash drum 46 may be in downstream communication with the vacuum overhead line 38 and the vacuum separator 36. The primary vacuum flash drum 46 may be operated at about 0.5 to about 48 torr and a temperature of about 50 to about 150° C. lower than the temperature of vacuum separator 36. The primary condensed vacuum stream in the primary vacuum flash bottoms line 50 may be further fractionated in a main fractionation column 130. The primary vacuum flash overhead line 48 may be in fluid communication with a vacuum source such as a vacuum pump or an eductor for pulling a vacuum on the primary vacuum flash overhead line 48. Non-condensable gases from the vacuum source may join other off-gas streams or be utilized in other refinery units.

The primary vapor vacuum stream in the primary vacuum flash overhead line 48 may be further cooled in a condenser to condense a portion of the primary vapor vacuum stream. The cooled primary vapor vacuum stream in the primary vacuum flash overhead line 48 may be separated in an intermediate vacuum flash drum 49 into an intermediate vapor vacuum stream in an intermediate vacuum flash overhead line 67 extending from a top of the second vacuum flash drum 49 and an intermediate condensed vacuum stream in an intermediate vacuum flash bottoms line 55 extending from a bottom of the intermediate vacuum flash drum. The intermediate vacuum flash drum 49 which may be in downstream communication with the primary vacuum flash drum 46 and the vacuum separator 36. The intermediate vacuum flash drum 49 may be operated at about 0.4 to about 46 torr and a temperature of about 50 to about 150° C. lower than the temperature of the primary vacuum flash drum 46. The intermediate condensed vacuum stream in the intermediate vacuum flash bottoms line 55 may be further fractionated in a main fractionation column 130. The intermediate vacuum flash overhead line 67 may be in fluid communication with a vacuum source such as a vacuum pump or an eductor for pulling a vacuum on the intermediate vacuum flash overhead line 67. Non-condensable gases from the vacuum source may join other off-gas streams or be utilized in other refinery units.

The intermediate vapor vacuum stream in the intermediate vacuum flash overhead line 67 may be further cooled in a condenser to condense a portion of the intermediate vapor vacuum stream. The cooled intermediate vapor vacuum stream in the intermediate vacuum flash overhead line 67 may be separated in a ultimate vacuum flash drum 52 into an ultimate vapor vacuum stream in a ultimate vacuum flash overhead line 54 extending from a top of the ultimate vacuum flash drum 52 and a ultimate condensed vacuum stream in a ultimate vacuum flash bottoms line 57 extending from a bottom of the ultimate vacuum flash drum. The ultimate vacuum flash drum 52 may be in downstream communication with the primary vacuum flash drum 46 and the intermediate vacuum flash drum 49, The ultimate vacuum flash drum 52 may be operated at about 0.3 to about 44 torr and a temperature of about −20 to about 20° C. The ultimate condensed vacuum stream in the ultimate vacuum flash bottoms line 57 may be further fractionated in a main fractionation column 130 of the fractionation section 100. The ultimate vacuum flash overhead line 54 may be in fluid communication with a vacuum source such as a vacuum pump or an eductor for pulling a vacuum on the intermediate vacuum flash overhead line 54. Non-condensable gases from the vacuum source may join other off-gas streams or be utilized in other refinery units.

The fractionation section may comprise a debutanizer column 150 and a main fractionation column 130. The main fractionation column 130 may be in downstream communication with the vacuum separator 36, specifically, in downstream communication with an overhead line 38 extending from a top of the vacuum separator 36. Moreover, the main fractionation column 130 may be in downstream communication with any or all of the primary vacuum flash drum 46, the intermediate vacuum flash drum 49 and the ultimate vacuum flash drum 52.

The hot vapor stream in the hot overhead line 26 may be hydrated from water line 25, cooled and separated in a cold high pressure separator 56. The cold high pressure separator 56 separates the hot vapor stream to provide a cold vapor stream comprising a hydrogen-rich gas stream in a cold overhead line 58 extending from a top of the cold high pressure separator 56 and a cold liquid stream in a cold bottoms line 60 extending from a bottom of the cold high pressure separator 56. The cold high pressure separator 56 serves to separate hydrogen-rich gas from hydrocarbon liquid in the hot vapor stream for recycle to the SHC reactor 12 in the cold overhead line 58. The hydrogen-rich gas in the cold vapor stream may be recycled to the SHC reactor 12 in line 18 perhaps after hydrogen purification and compression. The cold high pressure separator 56, therefore, is in downstream communication with the hot overhead line 26, the hot separator 24 and the SHC reactor 12.

The cold high pressure separator 56 may be operated at about 100° F. (38° C.) to about 150° F. (66° C.), suitably about 115° F. (46° C.) to about 145° F. (63° C.), and just below the pressure of the SHC reactor 12 accounting for pressure drop through intervening equipment to keep hydrogen and light gases in the cold overhead line 58 and normally liquid hydrocarbons in the cold bottoms line 60. The cold high pressure separator 56 may be operated at pressures between about 10 MPa (g) (1,450 psig) and about 24 MPa (g) (3,480 psig). The cold high pressure separator 56 may also have a boot for collecting an aqueous phase. The cold liquid stream in the cold bottoms line 60 may have a temperature of the operating temperature of the cold high pressure separator 56.

In an aspect, the cold liquid stream in the cold bottoms line 60 may be let down in pressure and flashed in a cold flash drum 62 to separate the cold liquid stream in the cold bottoms line 60. The cold flash drum 62 may be in direct, downstream communication with the cold bottoms line 60 of the cold high pressure separator 56 and in downstream communication with the SHC reactor 12. The cold flash drum 62 may separate the cold liquid stream in the cold bottoms line 60 to provide a cold flash vapor stream in a cold flash overhead line 64 extending from a top of the cold flash drum 62 and the cold flash liquid stream comprising a cold hydrocracked stream in the cold flash bottoms line 66 extending from a bottom of the cold flash drum. The cold flash vapor stream in the cold flash overhead line 64 may be concentrated in hydrogen sulfide, hydrogen and light hydrocarbon gases. The cold flash vapor stream may be further treated to remove hydrogen sulfide such as by stripping or scrubbing.

The cold flash drum 62 may be in downstream communication with the cold bottoms line 60, the cold high pressure separator 56, the hot overhead line 26, the hot high pressure separator 24, and the SHC reactor 12. The cold flash drum 62 may be operated at the same temperature as the cold high pressure separator 56 but typically at a lower pressure of between about 1.4 MPa (g) (203 psig) and about 6.9 MPa (g) (1000 psig) and preferably between about 2.4 MPa (g) (348 psig) and about 3.8 MPa (g) (551 psig). A flashed aqueous stream may be removed from a boot in the cold flash drum 62. The cold hydrocracked stream in the cold flash bottoms line 66 may have the same temperature as the operating temperature of the cold flash drum 62.

Hydrocracked products in the primary vacuum flash bottoms line 50, the intermediate vacuum flash bottoms line 55, the ultimate vacuum flash bottoms line 57 and the cold flash bottoms line 66 can be provided to the fractionation section 100. The fractionation section 100 may comprise the main fractionation column 130 operated at sub-atmospheric pressure and the debutanizer column 150. Hydrocracked products in the primary vacuum flash bottoms line 50, the intermediate vacuum flash bottoms line 55, the ultimate vacuum flash bottoms line 57 and the cold flash bottoms line 66 can be provided to the main fractionation column 130.

A heater may heat the cold hydrocracked stream in the cold flash bottoms line 66 before it enters the main fractionation column 130. The main fractionation column 130 may be in downstream communication with the primary vacuum flash drum 46, the intermediate vacuum flash drum 49 and the ultimate vacuum flash bottoms line 57 from the ultimate vacuum flash drum 52 and the cold flash bottoms line 66. A heater may heat the primary condensed vacuum stream in the primary vacuum flash bottoms line 50, the intermediate condensed vacuum stream in the intermediate vacuum flash bottoms line 55, and/or the ultimate condensed vacuum stream in the ultimate vacuum flash bottoms line 57 before they enter the main fractionation column 130. One or two of these condensed vacuum streams may still have substantial enthalpy from the SHC reactor 12 and do not have to rely on as much heating to be elevated to fractionation temperature. The ultimate condensed vacuum stream in the ultimate vacuum flash bottoms line from the ultimate vacuum flash drum 52 may be directed to a proper location of the main fractionation column 130 without additional heating. In an aspect, the cold hydrocracked stream in the cold flash bottoms line 66, the primary condensed vacuum stream in the primary vacuum flash bottoms line 50, the intermediate condensed vacuum stream in the intermediate vacuum flash bottoms line 55 and the ultimate condensed vacuum stream in the ultimate vacuum flash bottoms line 57 may be stripped with an inert gas before entering the main fractionation column 130.

The main fractionation column 130 may strip the cold flash liquid stream, the primary condensed vacuum stream, the intermediate condensed vacuum stream and the ultimate condensed vacuum stream with a hot, inert stripping media such as steam from line 132 to vaporize the cold flash liquid stream, the primary condensed vacuum stream, the intermediate condensed vacuum stream and the ultimate condensed vacuum stream to fractionate and provide several product streams. An overhead stream in a fractionator overhead line 131 may be condensed and fed to a receiver 133 which produces a net gas stream in a net gas line 134 extending from a top of the receiver and an overhead liquid stream taken from a receiver bottoms line extending from a bottom of the receiver 133. The overhead liquid stream may be split between a main net liquid stream comprising predominantly light diesel in a main net overhead liquid line 136 and a reflux liquid stream returned to the column in a reflux line. A sour water stream may be taken from a boot from the receiver 133. Other product streams from the main fractionation column 130 include a predominantly heavy diesel stream from a side cut outlet in a first side main line 140 and a light vacuum gas oil (LVGO) stream in a second side main line 142 from a side cut outlet and a heavy vacuum gas oil (HVGO) stream in in a bottoms line 148. No slop stream need be taken from the main fractionation column 130 because the pitch has been previously removed in the vacuum separator 36. Additionally, for this reason, the difficult separation of pitch from HVGO does not need to be performed in the main fractionation column 130. Heat may be removed from the main fractionation column 130 by cooling any of the streams taken from a side cut outlet and returning a portion of each cooled stream back to the column.

In an aspect, the main fractionation column 130 may be operated as a vacuum column. As such, a vacuum may be pulled on the net gas line 134 through a vacuum pump or eductor to maintain a pressure between about 5.3 kPa (a) (40 torr (a)) and 53.3 kPa (a) (400 torr (a)) and a temperature of about 180 to about 290° C. The main fractionation column 130 may also be operated at slightly atmospheric pressure such as about 20.7 kPa (g) (3 psig) to about 207 kPa (g) (30 psig) and a temperature of about 220 to about 343° C.

The main net gas stream in the main net gas line 134 may be stripped in the debutanizer column 150 with an inert stripping gas such as steam from stripping line 152. The debutanizer column 150 may fractionate the net gas stream to provide product streams. An overhead stream in a debutanizer overhead line 151 may be condensed and fed to a receiver 153 which produces a light gas stream in an off-gas line 154 extending from a top of the receiver and an overhead liquid stream taken in a receiver bottoms line extending from a bottom of the receiver 153. The overhead liquid stream may be split between a net liquid stream comprising predominantly liquefied petroleum gas in a net overhead liquid line 156 and a reflux liquid stream returned to the column in a reflux line. A sour water stream may be taken from a boot from the receiver 153. A debutanized stream comprising predominantly naphtha may be produced in a debutanized bottoms line 158. In an aspect, the debutanizer column 150 may be operated at about 137.8 kPa (g) (20 psig) to about 1378 kPa (g) (200 psig) and a temperature of about 20 to about 80° C.

Typically, to separate pitch from heavy VGO, a fractionator feed stream must be heated to about 750° F. which could cause cracking of the feed and coke production. By removing the pitch stream in the vacuum bottoms line 40, the fractionator feed containing the highest boiling point materials in the primary vacuum flash bottoms line 50 does not contain a pitch fraction and it may only require a temperature of about 180° C. (356° F.) to about 343° C. (650° F.) to evaporate depending on pressure of operations in the main fractionation column 130. Therefore, cracking and coking is minimized in the fractionation column 130.

Figure 2:
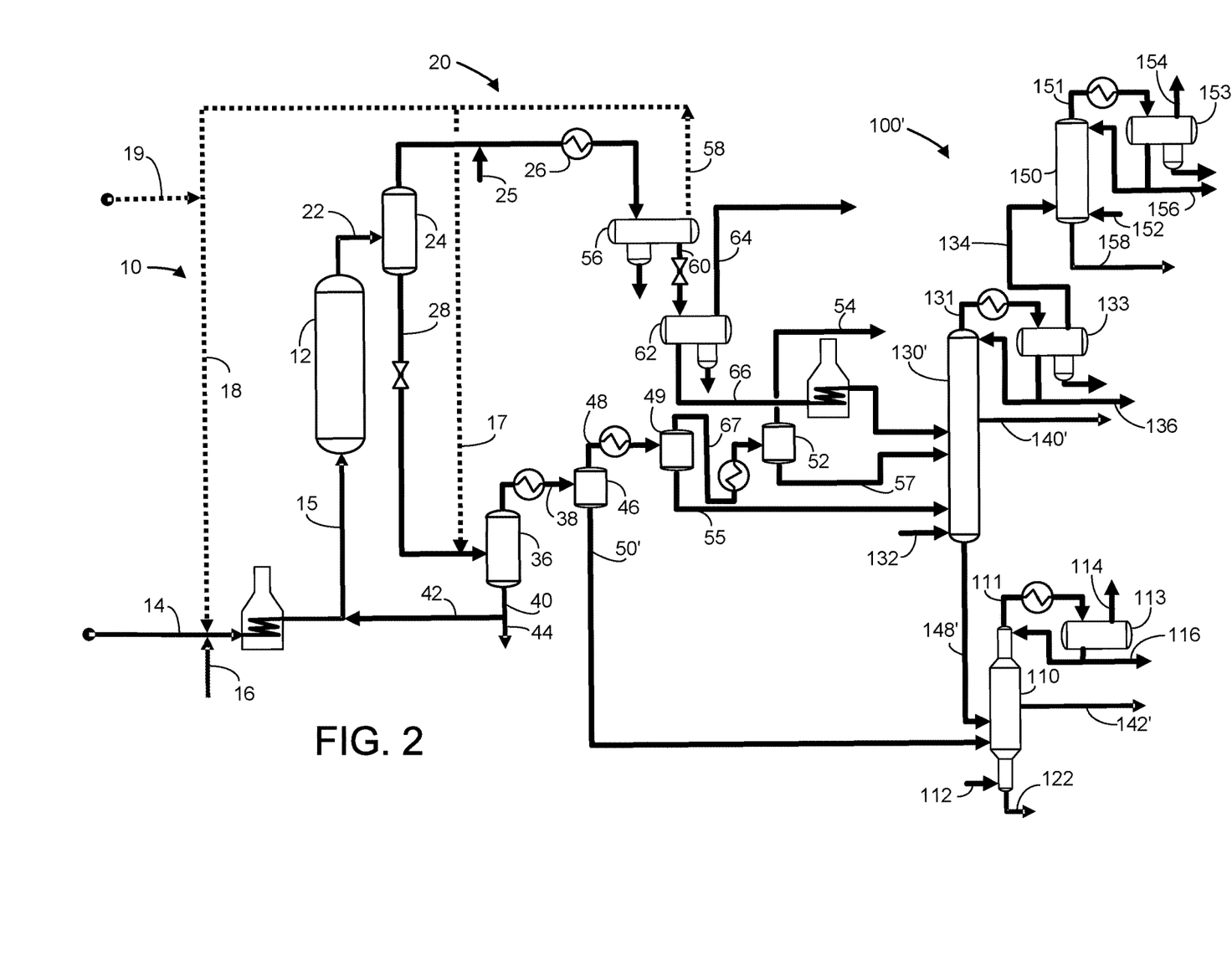
FIG. 2 is an alternative process flow diagram to FIG. 1.

In FIG. 2, the fractionation section 100' comprises a main fractionation column 130' and a product fractionation column 110. Two fractionation columns may provide more flexible heat integration than a single fractionation column as in the embodiment of FIG. 1. Many of the elements in FIG. 2 have the same configuration as in FIG. 1 and bear the same reference number. Elements in FIG. 2 that correspond to elements in FIG. 1 but have a different configuration bear the same reference numeral as in FIG. 1 but are marked with a prime symbol ('). The main fractionation column 130' is in downstream communication with a primary vacuum flash overhead line 48 from the primary vacuum flash drum 46, the intermediate vacuum flash drum 49, and the ultimate vacuum flash bottoms line 57 from the ultimate vacuum flash drum 52 and the cold flash bottoms line 66 from the cold flash drum 62.

The main fractionation column 130' may strip the cold flash liquid stream, the intermediate condensed vacuum stream and the ultimate condensed vacuum stream with a hot, inert stripping media such as steam from line 132 to vaporize the cold flash liquid stream, the intermediate condensed vacuum stream and the ultimate condensed vacuum stream to fractionate and provide several product streams. An overhead stream in a main fractionator overhead line 131 may be condensed and fed to a receiver 133 which produces a main net gas stream in a main net gas line 134 extending from a top of the receiver and an overhead liquid stream taken from a receiver bottoms line extending from a bottom of the receiver 133. The overhead liquid stream may be split between a main net liquid stream comprising predominantly light diesel in a main net overhead liquid line 136 and a reflux liquid stream returned to the column in a reflux line. A sour water stream may be taken from a boot from the receiver 133. A main heavy stream from a side cut outlet in a side main line 140' comprising predominantly heavy diesel may be taken from the main fractionation column 130'. A heavy bottoms stream comprising predominantly VGO may be taken from a bottoms outlet from the main fractionation column 130' in a main bottoms line 148'. The main fractionation column 130' is operated at slightly atmospheric pressure such as about 6.9 kPa (g) (1 psig) to about 207 kPa (g) (30 psig) and a temperature of about 148 to about 290° C. Heat may be removed from the main fractionation column 130' by cooling the heavy stream taken from a side cut outlet in the side product line 140' and returning a portion of the cooled stream back to the column.

A product fractionation column 110 may strip the heavy bottoms stream in the product fractionation bottoms line 148' and the primary condensed vacuum stream in the primary vacuum flash bottoms line 50' with an inert stripping media such as steam from an inert gas line 112 to vaporize the heavy bottoms stream and the primary condensed vacuum stream and provide product streams. Because a pitch stream is removed in the upstream vacuum separator 36, the fractionation is much more easily performed due to the reduction in volume and low fouling potential in the low pitch heavy stream and the primary condensed vacuum stream. An overhead stream in a vacuum fractionator overhead line 111 may be condensed and fed to a receiver 113 which produces a product net gas stream in a product net gas line 114 extending from a top of the receiver and a product net overhead liquid stream taken from a receiver bottoms line 116 extending from a bottom of the receiver 113. A vacuum may be pulled on the product net gas line 114 to generate a vacuum in the product fractionation column 110. The overhead liquid stream may be split between a product net liquid stream comprising predominantly heavy diesel in the product net overhead liquid line 116 and a reflux liquid stream returned to the column in a reflux line. A product side stream comprising predominantly LVGO may be taken in a product side line 142' from a side outlet and a products bottom stream in a product bottoms line 122 comprising predominantly HVGO may be taken from a bottom of the product fractionation column 110.

In an aspect, the product fractionation column 110 may be operated as a vacuum column at a pressure between about 0.1 kPa (a) (1 torr (a)) and about 40 kPa (g) (300 torr (a)), preferably, between about 1.3 kPa (a) (10 torr (a)) and 13.3 kPa (a) (100 torr (a)). The vacuum distillation temperature may be maintained at about 240° C. (462° F.) to about 300° C. (572° F.). Heat may be removed from the product fractionation column 110 by cooling the product side stream taken from the side cut outlet and returning a portion of the cooled stream back to the column.

Figure 3:
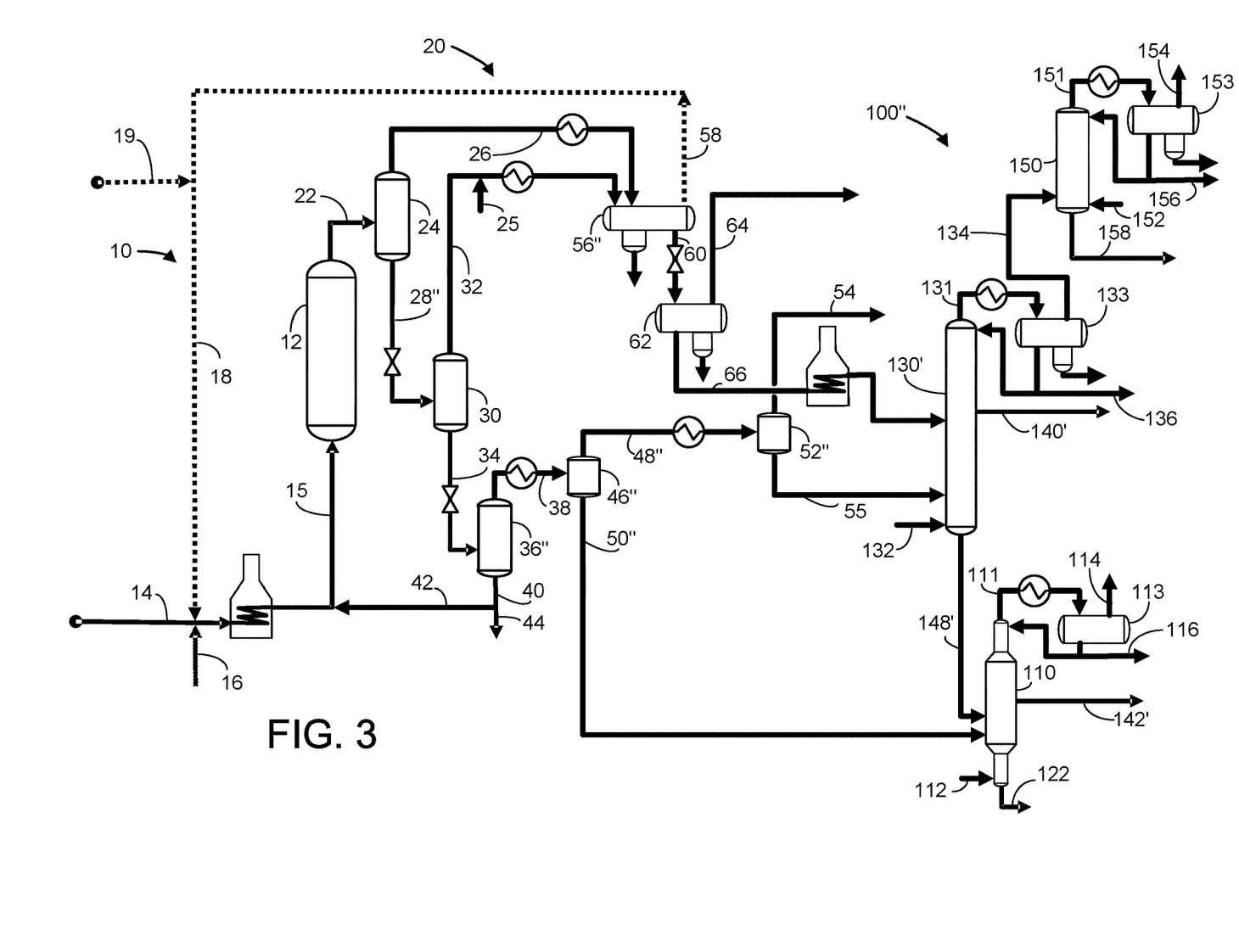
FIG. 3 is an alternative process flow diagram to FIG. 2.

FIG. 3 depicts an embodiment that utilizes an additional low pressure separator 30. With the additional low pressure separator 30, the flow rate of the vapor vacuum stream in the vacuum overhead line 38 is less than in the embodiment described in FIG. 1, which may eliminate the need for one vacuum flash drum such as the intermediate flash drum 49. Many of the elements in FIG. 3 have the same configuration as in FIG. 2 and bear the same reference number. Elements in FIG. 3 that correspond to elements in FIG. 2 but have a different configuration bear the same reference numeral as in FIG. 2 but are marked with a double prime symbol (").

In FIG. 3, the hot liquid stream from the hot high pressure separator 24 in the hot bottoms line 28" is let down in pressure and separated in a low pressure separator 30. The low pressure separator 30 separates the hot liquid stream in the hot bottoms line 28" at low pressure to provide a low pressure vapor stream in a low pressure overhead line 32 extending from a top of the low pressure separator 30 and a low pressure liquid stream comprising a slurry hydrocracked stream in a low pressure bottoms line 34 extending from a bottom of the low pressure separator. The low pressure separator 30 is operated at about 172.3 kPa (g) (25 psig) to about 1723 kPa (g) (250 psig) and similar to or lower than the temperature of the hot high pressure separator 24.

The low pressure vapor stream in the low pressure overhead line 32 may also be hydrated, cooled and separated in the cold high pressure separator 56". The low pressure liquid stream comprising a hot hydrocracked stream in the low pressure bottoms line 34 may be let down in pressure and separated in a vacuum separator 36". Because the reactor effluent in the low pressure vapor stream 32 is introduced to the cold pressure separator 56", an intermediate vacuum flash in the intermediate flash drum 49 in the embodiments of FIGS. 1 and 2 can be eliminated. Accordingly, the primary vacuum flash overhead line 48" feeds the primary vapor vacuum stream from the primary vacuum flash drum to an ultimate vacuum flash drum 52" and a primary vacuum condensed stream in the primary vacuum bottoms line 50" to the fractionation section 100". In the embodiment of FIG. 3, the primary vacuum bottoms line 50" is fed to the product fractionation column 110, but if only a main fractionation column 130' is used as in FIG. 2. Otherwise if only a single main fractionation column 130 is used, the primary vacuum bottoms line 50' may feed the main fractionation column 130 as shown in FIG. 1. Everything else in FIG. 3 is essentially the same as in FIG. 2.

EXAMPLES

In a pilot plant operation, Arabian Heavy vacuum resid was slurry hydrocracked at 451° C. (850° F.), 17.6 MPa (g)

(2550 psig), with a molybdenum catalyst made according to the teachings of U.S. Pat. No. 4,740,489 in a lab scale well mixed reactor.

Example 1

In Example 1, the process was run in a once-through configuration to achieve about 95% pitch conversion. About 2.2 wt % mesophasic material was formed in the reactor product.

Example 2

In Example 2, the process was run with a pitch recycle configuration. About 95% pitch conversion was obtained. To recover pitch, a pitch-containing stream was contained in a hot pressure separator at about 17.51 MPa (g) (2540 psig) and about 343° C. The hot high pressure separator bottoms was further concentrated in a cold low pressure separator operated at about 206 kPa (g) (30 psig) and 148° C. The cold separator bottom stream was then subjected to a deep vacuum flash which operated at about 0.5 torr and 260° C. (500° F.) to obtain a pitch-rich stream. The vacuum flash separator vapor stream was condensed sequentially to a final temperature of about 10° C. to provide liquid reactor products. The pitch-rich stream flowing at about 40% relative to fresh feed mass flow rate was recycled to the reactor. The recycle stream comprised about 71.5 wt % pitch. About 0.2% wt mesophasic material was quantified in the reactor product.

Example 2 demonstrates the effectiveness of recycling a pitch stream generated from a vacuum separation step to the SHC reactor to maintain stable reactor operation at 95% pitch conversion by production of much less mesophasic material than in Example 1. Example 2 also demonstrates 40% pitch-rich recycle can be achieved to provide stable slurry hydrocracking reactor operation in an energy efficient vacuum flash step instead of a more energy intensive fractionation step requiring fractionation of more material with more energy input and high fouling potential.

Specific Embodiments

While the following is described in conjunction with specific embodiments, it will be understood that this description is intended to illustrate and not limit the scope of the preceding description and the appended claims.

A first embodiment of the invention is a process for slurry hydrocracking comprising slurry hydrocracking a hydrocarbon feed in a slurry hydrocracking reactor to provide a hydrocracked effluent stream; separating a hot hydrocracked stream, taken from the hydrocracked effluent stream, under vacuum pressure to provide a vapor vacuum stream and a pitch stream; recycling the pitch stream to slurry hydrocracking; and fractionating the vapor vacuum stream. An embodiment of the invention is one, any or all of prior embodiments in this paragraph up through the first embodiment in this paragraph further comprising separating the hydrocracked effluent stream under high pressure to provide a hot vapor stream and hot liquid stream and the hot hydrocracked stream is taken from the hot liquid stream. An embodiment of the invention is one, any or all of prior embodiments in this paragraph up through the first embodiment in this paragraph further comprising separating the hot liquid stream under low pressure to provide a low pressure vapor stream and the hot hydrocracked stream and separating the low pressure vapor stream into a cold vapor stream and a cold liquid stream and fractionating a cold hydrocracked stream taken from the cold liquid stream. An embodiment of the invention is one, any or all of prior embodiments in this paragraph up through the first embodiment in this paragraph further comprising operating the slurry hydrocracking reactor to achieve at least 95% pitch conversion and at least 70 wt % pitch in the pitch stream. An embodiment of the invention is one, any or all of prior embodiments in this paragraph up through the first embodiment in this paragraph further comprising recycling a mass ratio of pitch to feed of about 0.2 to about 1. An embodiment of the invention is one, any or all of prior embodiments in this paragraph up through the first embodiment in this paragraph further comprising cooling the vapor vacuum stream and separating the vapor vacuum stream into a vapor vacuum stream and a condensed vacuum stream and fractionating the condensed vacuum stream under vacuum pressure. An embodiment of the invention is one, any or all of prior embodiments in this paragraph up through the first embodiment in this paragraph wherein the vapor vacuum stream is a primary vapor vacuum stream and the condensed vacuum stream is a primary condensed vacuum stream and further comprising cooling the primary vapor vacuum stream and separating the primary vapor vacuum stream into an ultimate vapor vacuum stream and an ultimate condensed vacuum stream and fractionating the ultimate condensed vacuum stream. An embodiment of the invention is one, any or all of prior embodiments in this paragraph up through the first embodiment in this paragraph wherein separating the primary vapor vacuum stream into an ultimate vapor vacuum stream and an ultimate condensed vacuum stream comprises separating the primary vapor vacuum stream into an intermediate vapor vacuum stream and an intermediate condensed vacuum stream and cooling the intermediate vapor vacuum stream and separating the intermediate vapor vacuum stream into the ultimate vapor vacuum stream and the ultimate condensed vacuum stream. An embodiment of the invention is one, any or all of prior embodiments in this paragraph up through the first embodiment in this paragraph further comprising fractionating the intermediate condensed vacuum stream. An embodiment of the invention is one, any or all of prior embodiments in this paragraph up through the first embodiment in this paragraph further comprising separating the hydrocracked effluent stream under high pressure to provide a hot vapor stream and hot liquid stream; separating the hot vapor stream into a cold vapor stream and a cold liquid stream; taking a cold hydrocracked stream from the cold liquid stream; and fractionating the cold hydrocracked stream; and fractionating the condensed vacuum stream. An embodiment of the invention is one, any or all of prior embodiments in this paragraph up through the first embodiment in this paragraph further comprising separating the cold liquid stream to provide a cold flash vapor stream and the cold hydrocracked stream. An embodiment of the invention is one, any or all of prior embodiments in this paragraph up through the first embodiment in this paragraph wherein fractionating the cold hydrocracked stream provides a net gas stream and debutanizing the net gas stream with the cold flash vapor stream.

A second embodiment of the invention is an apparatus for slurry hydrocracking comprising a slurry hydrocracking reactor; a vacuum separator in downstream communication with the slurry hydrocracking reactor; and a fractionation column in downstream communication with the vacuum separator. An embodiment of the invention is one, any or all of prior embodiments in this paragraph up through the second embodiment in this paragraph wherein the slurry hydrocracking reactor is in downstream communication with a bottoms line extending from a bottom of the vacuum separator and the fractionation column is in downstream communication with an overhead line extending from a top of the vacuum separator. An embodiment of the invention is one, any or all of prior embodiments in this paragraph up through the second embodiment in this paragraph further comprising a vacuum flash drum in downstream communication with the overhead line of the vacuum separator and the fractionation column is in downstream communication with the vacuum flash drum. An embodiment of the invention is one, any or all of prior embodiments in this paragraph up through the second embodiment in this paragraph further comprising a hot separator in downstream communication with the slurry hydrocracking reactor and the vacuum separator is in downstream communication with the hot separator. An embodiment of the invention is one, any or all of prior embodiments in this paragraph up through the second embodiment in this paragraph further comprising a low pressure separator in downstream communication with the hot separator and the vacuum separator is in downstream communication with the low pressure separator. An embodiment of the invention is one, any or all of prior embodiments in this paragraph up through the second embodiment in this paragraph wherein the fractionation column is in downstream communication with an overhead line extending from a top of the vacuum flash drum and a vacuum fractionation column is in downstream communication with a bottoms line extending from a bottom of the vacuum flash drum.

A third embodiment of the invention is a process for slurry hydrocracking comprising slurry hydrocracking a hydrocarbon feed in a slurry hydrocracking reactor to provide a hydrocracked effluent stream; separating the hydrocracked effluent stream to provide a hot vapor stream and a hot liquid stream; separating a hot hydrocracked stream, taken from the hot liquid stream, under vacuum pressure to provide a vapor vacuum stream and a pitch stream; recycling the pitch stream to slurry hydrocracking; condensing the vapor vacuum stream; separating the vapor vacuum stream to provide a vapor vacuum stream and a condensed vacuum stream; and fractionating the condensed vacuum stream. An embodiment of the invention is one, any or all of prior embodiments in this paragraph up through the third embodiment in this paragraph further comprising separating the hot liquid stream under low pressure to provide a low pressure vapor stream and the hot hydrocracked stream; separating the hot vapor stream and the low pressure vapor stream to provide a cold vapor stream and a cold liquid stream and taking a cold hydrocracked stream from the cold liquid stream and fractionating the cold hydrocracked stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A process for slurry hydrocracking comprising:
slurry hydrocracking a hydrocarbon feed in a slurry hydrocracking reactor to provide a hydrocracked effluent stream;
separating a hot hydrocracked stream, taken from said hydrocracked effluent stream, under vacuum pressure to provide a vapor vacuum stream and a pitch stream;
recycling said pitch stream to slurry hydrocracking;
fractionating said vapor vacuum stream;
separating said hydrocracked effluent stream under high pressure to provide a hot vapor stream and hot liquid stream and said hot hydrocracked stream is taken from said hot liquid stream; and
separating said hot liquid stream under low pressure to provide a low pressure vapor stream and said hot hydrocracked stream and separating said low pressure vapor stream into a cold vapor stream and a cold liquid stream and fractionating a cold hydrocracked stream taken from said cold liquid stream.

2. The process of claim 1 further comprising operating said slurry hydrocracking reactor to achieve at least 95% pitch conversion and at least 70 wt % pitch in the pitch stream.

3. The process of claim 1 further comprising recycling a mass ratio of pitch to feed of about 0.2 to about 1.

4. The process of claim 1 further comprising cooling said vapor vacuum stream and separating said vapor vacuum stream into a vapor vacuum stream and a condensed vacuum stream and fractionating said condensed vacuum stream under vacuum pressure.

5. The process of claim 4 wherein said vapor vacuum stream is a primary vapor vacuum stream and said condensed vacuum stream is a primary condensed vacuum stream and further comprising cooling said primary vapor vacuum stream and separating said primary vapor vacuum stream into an ultimate vapor vacuum stream and an ultimate condensed vacuum stream and fractionating said ultimate condensed vacuum stream.

6. The process of claim 5 wherein separating said primary vapor vacuum stream into an ultimate vapor vacuum stream and an ultimate condensed vacuum stream comprises separating said primary vapor vacuum stream into an intermediate vapor vacuum stream and an intermediate condensed vacuum stream and cooling said intermediate vapor vacuum stream and separating said intermediate vapor vacuum stream into said ultimate vapor vacuum stream and said ultimate condensed vacuum stream.

7. The process of claim 6 further comprising fractionating said intermediate condensed vacuum stream.

8. The process of claim 6 further comprising:
separating said hot vapor stream into said cold vapor stream and said cold liquid stream;
taking said cold hydrocracked stream from said cold liquid stream; and
fractionating said cold hydrocracked stream; and
fractionating said condensed vacuum stream.

9. The process of claim 8 further comprising separating said cold liquid stream to provide a cold flash vapor stream and said cold hydrocracked stream.

10. The process of claim 9 wherein fractionating said cold hydrocracked stream provides a net gas stream and debutanizing said net gas stream with said cold flash vapor stream.

11. A process for slurry hydrocracking comprising:
slurry hydrocracking a hydrocarbon feed in a slurry hydrocracking reactor to provide a hydrocracked effluent stream;

separating said hydrocracked effluent stream to provide a hot vapor stream and a hot liquid stream;

separating said hot liquid stream under low pressure to provide a low pressure vapor stream and a hot hydrocracked stream and separating said low pressure vapor stream into a cold vapor stream and a cold liquid stream and fractionating a cold hydrocracked stream taken from said cold liquid stream;

separating said hot hydrocracked stream, taken from said hot liquid stream, under vacuum pressure to provide a vapor vacuum stream and a pitch stream;

recycling said pitch stream to slurry hydrocracking;

condensing said vapor vacuum stream;

separating said vapor vacuum stream to provide a vapor vacuum stream and a condensed vacuum stream; and fractionating said condensed vacuum stream.

12. The process of claim 11 further comprising separating said hot vapor stream to provide said cold vapor stream and said cold liquid stream and taking said cold hydrocracked stream from said cold liquid stream and fractionating said cold hydrocracked stream.

\* \* \* \* \*